(12) United States Patent
Cilingir et al.

(10) Patent No.: US 12,099,716 B2
(45) Date of Patent: Sep. 24, 2024

(54) METHOD AND DISPLAY DEVICE FOR PRESENTING PARAMETERS OF A FOOD MACHINE, AND FOOD MACHINE

(71) Applicant: GEA Food Solutions Germany GmbH, Biedenkopf-Wallau (DE)

(72) Inventors: Erdal Cilingir, Bad Laasphe (DE); Peter De Hoog, Herten (NL); Stefan Maidel, Kempten (DE); Dennis Theelen, Horst (NL); Jochen Rehn, Biedenkopf-Wallau (DE)

(73) Assignee: GEA Food Solutions Germany GmbH, Biedenkopf-Wallau (DE)

( * ) Notice: Subject to any disclaimer, the term of this patent is extended or adjusted under 35 U.S.C. 154(b) by 0 days.

(21) Appl. No.: 17/915,125

(22) PCT Filed: Mar. 30, 2021

(86) PCT No.: PCT/EP2021/058329
§ 371 (c)(1),
(2) Date: Sep. 28, 2022

(87) PCT Pub. No.: WO2021/198274
PCT Pub. Date: Oct. 7, 2021

(65) Prior Publication Data
US 2023/0152965 A1    May 18, 2023

(30) Foreign Application Priority Data

Apr. 1, 2020 (DE) .......................... 102020204259.4
Aug. 27, 2020 (DE) .......................... 102020210856.0

(51) Int. Cl.
*G06F 3/04886* (2022.01)
*G06F 3/041* (2006.01)
(Continued)

(52) U.S. Cl.
CPC ........ *G06F 3/04886* (2013.01); *G06F 3/0412* (2013.01); *G06F 3/04845* (2013.01); *G06Q 50/04* (2013.01)

(58) Field of Classification Search
CPC ............... G06F 3/04886; G06F 3/0412; G06F 3/04845; G06Q 50/04
(Continued)

(56) References Cited

U.S. PATENT DOCUMENTS

2016/0077678 A1* 3/2016 Reese ................... G06F 3/0481
                                                                      99/342
2020/0359649 A1* 11/2020 Maeno ..................... A23G 9/04
(Continued)

FOREIGN PATENT DOCUMENTS

| CN | 113316547 A | * | 8/2021 | ............. A47J 27/10 |
| DE | 102015103596 A1 | | 9/2016 | |
| WO | WO-2016179424 A1 | * | 11/2016 | ............... A23L 5/15 |

OTHER PUBLICATIONS

International Search Report and Written Opinion dated Jul. 14, 2021, for International Application No. PCT/EP2021/058329.
(Continued)

*Primary Examiner* — Kwin Xie
(74) *Attorney, Agent, or Firm* — The Dobrusin Law Firm, P.C.

(57) ABSTRACT

A method for presenting parameters of a food machine, a food processing machine, or a food packaging machine, by a display device, where a memory stores a first recipe that includes multiple parameters that each have an assigned first parameter value and stores a second recipe that includes multiple parameters that each have an assigned second parameter value; where in an ascertainment step, a parameter is ascertained that is contained in the first recipe and in the second recipe and that has an assigned first parameter value of the first recipe and an assigned second parameter
(Continued)

value of the second recipe, which differ from each other; and in a first display step, the display device is used to display the first parameter value and the second parameter value for the ascertained parameter at the same time.

20 Claims, 1 Drawing Sheet

(51) Int. Cl.
     *G06F 3/04845*    (2022.01)
     *G06Q 50/04*      (2012.01)

(58) Field of Classification Search
     USPC .................................................. 345/173–174
     See application file for complete search history.

(56) References Cited

U.S. PATENT DOCUMENTS

| 2021/0124328 | A1* | 4/2021 | Wise | G05B 19/41865 |
| 2021/0270521 | A1* | 9/2021 | Crutcher | F25D 17/06 |

OTHER PUBLICATIONS

International Preliminary Report on Patentability dated Jul. 27, 2022, for International Application No. PCT/EP2021/058329.

\* cited by examiner

METHOD AND DISPLAY DEVICE FOR PRESENTING PARAMETERS OF A FOOD MACHINE, AND FOOD MACHINE

CROSS-REFERENCE TO RELATED APPLICATIONS

This application is a US National Phase of PCT/EP2021/058329 filed on Mar. 30, 2021, which claims priority to DE 10 2020 204 259.4 filed on Apr. 1, 2020 and to DE 10 2020 210 856.0 filed on Aug. 27, 2020, all of which are hereby incorporated by reference herein for all purposes.

FIELD

These teachings relate to a method for presenting parameters of a food machine, a food processing machine, or a food packaging machine, by a display device, where a memory stores a first recipe that includes multiple parameters that each have an assigned first parameter value; to a display device for a food machine, a food processing machine, or a food packaging machine; and to a food machine, a food processing machine, or a food packaging machine that includes a display device.

BACKGROUND

Food machines, such as food processing machines or food packaging machines, usually have a display device in which information about the current state of the food machine can be displayed. It is often possible to display one or more measured values. In addition, such display devices can typically also deduce currently set parameter values of the machine, for example a speed of a drive of the machine set by an operator and thus predefined.

The display of the currently set parameter values allows an operator to get an idea of the current state of the machine. However, especially in such situations where the operator has changed, for example when there is a shift change, it is often difficult for the operator to understand changes in parameter values without additional information from a previous operator. Such changes may have contributed to the machine being in a fault state or being in a fault state in the future.

SUMMARY

The object of the present invention is to facilitate the ascertainment of the cause of a fault by an operator.

To achieve the object, in accordance with the invention, a method for presenting parameters of a food machine, in particular a food processing machine or a food packaging machine, by means of a display device of the food machine is proposed, wherein a memory stores a first recipe comprising multiple parameters that each have an assigned first parameter value and stores a second recipe comprising multiple parameters that each have an assigned second parameter value,
  a. wherein in an ascertainment step a parameter is ascertained that is contained in the first and the second recipe and that has an assigned first parameter value of the first recipe and an assigned second parameter value of the second recipe, which differ from each other,
  b. wherein in a first display step the display device is used to display the first and the second parameter value for the ascertained parameter at the same time.

By ascertaining and simultaneously displaying the first parameter value of the first recipe and the second parameter value of the second recipe for the same parameter in accordance with the invention, the operator of the food machine can detect changes with respect to a first recipe used as a reference in a second recipe, for example one that is currently being used. In this way, the operator can more quickly detect such parameter values that have been changed. This makes it easier for the operator to determine any causes that have led or will lead to an undesirable state of the food machine, in particular a fault state.

For the purposes of the invention, a recipe is understood to be a data set which has parameter values which each have an assigned parameter. The parameters represent settable properties of the food machine, i.e. properties that can be specified by an operator, for example. Such parameters can be, for example, time specifications for activating and/or deactivating elements of the food machine, specifications for the activation state of functions or elements of the food machine, or other settable physical variables and/or setpoints of control loops. Parameters in the sense of the invention are in particular not understood to be measured values.

The food machine operator can be, for example, a laborer, a shift supervisor, or a maintenance worker.

Preferably, in the ascertainment step for ascertaining the parameter contained in the first and second recipe, a comparison of parameters of the first recipe and the second recipe is performed. Attributes assigned to the parameters of the first recipe and the second recipe, for example a name, can be compared with one another. To ascertain differing parameter values in the ascertainment step, a comparison of the parameter values of the parameter contained in the first and second recipe can be performed, for example by comparing binary data.

According to an advantageous embodiment of the invention, it is provided that the first recipe is a predefined standard recipe and the second recipe is a variant recipe changed by an operator of the food machine with respect to the standard recipe. It is possible that the display device takes the first display step as soon as a parameter value of a parameter of the currently selected (second) recipe is changed. With such an embodiment of the method, the changed parameter value according to the currently selected recipe can thus always be displayed as well as a predefined first parameter value, which forms a standard or default value. Such an embodiment offers the advantage that the operator can immediately make a comparison with the standard or default value during the setting process of a parameter.

An alternative, advantageous embodiment provides that—in a selection step preceding the ascertainment step—the first recipe and the second recipe are selected by an operator of the food machine from a specified set of stored recipes. According to such an embodiment, it is possible for an operator to select any two recipes and to compare their parameter values. The two recipes can be two different variants or versions of a common family of recipes, preferably relating to the same food product to be produced and/or packaged. Alternatively, it is possible that the first and the second recipe relate to different food products to be produced and/or packaged, but have at least one common parameter of which the respective parameter values in the first and second recipe can be compared with each other.

Preferably, it is provided that, for selecting the first recipe and/or the second recipe, an indicator is detected by a detection device and the first and/or second recipe is ascertained by a selection unit depending on the detected indicator. The selection unit can read out a stored link of the indicator with the recipe and select a recipe suitable for the particular food machine. The indicator can, for example, be applied to or arranged on an order document or a container.

Preferably, the indicator is an optically detectable indicator, for example a bar code or a two-dimensional code, and the detection device is an optical detection device, for example a bar code detection device or a detection device for detecting a two-dimensional code. Alternatively, the indicator can be an indicator detectable by an electromagnetic field, for example an RFID transponder, and the detection device can be a detection device for reading an indicator detectable by an electromagnetic field, for example an RFID reader.

Preferably, it is provided that the first and the second recipe are stored in a memory of the food machine. In this respect, the recipes for operating the food machine can be kept in the food machine itself. A transfer of the data from an external memory to the food machine or the display device is not necessary.

An alternative, preferred embodiment provides that the first and second recipes are stored in an external memory connected to the food machine, in particular a cloud memory. Although such an embodiment requires data exchange between the food machine, in particular the display device, the advantage can be achieved that the same recipes stored in a common external memory can be retrieved by several, different food machines.

According to an advantageous embodiment of the method according to the invention, in the first display step the display device is used to display, in addition to the first and second parameter values of the ascertained parameter, also a further parameter value of a further parameter which is contained in the first and the second recipes and which has an assigned identical third parameter value according to the first recipe and the second recipe. Since the operator is shown not only those parameter values that differ in the two recipes, but also those that are identical, the operator's understanding of the recipe, in particular the interaction of the individual parameter values with each other, can be facilitated.

A particularly advantageous embodiment is one in which in a second display step the display device is used to display, in addition to the first and second parameter values of the ascertained parameter, also a further parameter value of a further parameter which is contained in the first and the second recipe and which has an assigned identical third parameter value according to the first recipe and the second recipe, wherein the further parameter value is not displayed in the first display step, and
wherein a change is made, in particular a change back and forth, between the first and the second display step by an input of an operator. In such an embodiment, it is possible for the operator to selectively activate or deactivate the display of the identical parameter value(s).

It is advantageous if the third parameter value is displayed in a different presentation form, for example only as a single value and/or in a different font and/or in a different font size and/or in a different color and/or against a different background color and/or in a different brightness than the first and second parameter values. This can improve the visibility of the first and second parameter values and thus make it easier for the operator to detect those parameter values that differ in the recipes.

An advantageous embodiment provides that the display device comprises a touch-sensitive screen, for example a touchscreen. In this respect, the display device can be part of an operating and display device via which both information can be displayed and operating commands, for example touching of an area of the screen or a swipe gesture, can be received.

Another object of the invention is to provide a display device for a food machine, in particular a food processing machine or a food packaging machine, which is configured
a. in an ascertainment step to ascertain a parameter that is contained in a first and a second recipe and that has an assigned first parameter value of the first recipe and an assigned second parameter value of the second recipe, which differ from each other,
b. in a first display step to display the first and second parameter values for the ascertained parameter at the same time.

Another object of the invention is to provide a food machine, in particular a food processing machine or a food packaging machine, comprising a display device as described above.

For example, the food machine can be a slicer, defroster, cutter, mixer, thermoforming packaging machine, vertical form fill seal machine, or horizontal form fill seal machine.

In the case of the display device and the food machine, the same advantages can be achieved which have already been explained in conjunction with the method according to the invention. The advantageous embodiments and features described in conjunction with the method can also be applied to the display device and the food machine alone or in combination.

To achieve the above-mentioned object, a method for presenting parameters of a food machine, in particular a food processing machine or a food packaging machine, by means of a display device of the food machine is further proposed, wherein a memory stores a first recipe comprising multiple parameters which each have an assigned first parameter value, and stores a second recipe comprising multiple parameters which each have an assigned second parameter value,
a. wherein in an ascertainment step a parameter is ascertained which is contained in the second recipe and is not contained in the first recipe,
b. wherein in a first display step the ascertained parameter and a specification, in particular a name, of the second recipe are displayed by means of the display device (1).

By the ascertainment and display of the parameter contained in the first recipe, but not in the second recipe, provided in accordance with the invention, the operator of the food machine can detect changes with respect to a first recipe used as a reference in a second recipe, for example one that is currently being used. In this way, the operator can more quickly detect such parameters that have been added, for example, by a change in the recipe and/or by a modification of the food machine, compared to the first recipe. This makes it easier for the operator to determine any causes that have led or will lead to an undesirable state of the food machine, in particular a fault state.

A recipe is understood to be a data set that has parameter values which each have an assigned parameter. The parameters represent settable properties of the food machine, i.e. properties that can be specified by an operator, for example. Such parameters can be, for example, time specifications for activating and/or deactivating elements of the food machine, specifications for the activation state of functions or elements of the food machine, or other settable physical variables and/or setpoints of control loops. Parameters in the sense of the invention are in particular not understood to be measured values.

The food machine operator can be, for example, a laborer, a shift supervisor, or a maintenance worker.

Preferably, in the ascertainment step for ascertaining the parameter contained in the second, but not in the first recipe, a comparison of the set of parameters of the first recipe and of the set of parameters of the second recipe is performed. Attributes assigned to the parameters of the first recipe and the second recipe, for example a name, can be compared with one another.

According to an advantageous embodiment of the invention, it is provided that the first recipe is a predefined standard recipe and the second recipe is a variant recipe changed by an operator of the food machine with respect to the standard recipe. It is possible that the display device takes the first display step as soon as a parameter of the currently selected (second) recipe is added. With such an embodiment of the method, the added parameter according to the currently selected recipe can thus always be displayed, as well as its affiliation to a recipe (here the second recipe). Such an embodiment offers the advantage that the operator can immediately make a comparison with the standard or default recipe during the setting process of a parameter.

An alternative, advantageous embodiment provides that—in a selection step preceding the ascertainment step—the first recipe and the second recipe are selected by an operator of the food machine from a predefined set of stored recipes. According to such an embodiment, it is possible for an operator to select any two recipes and compare their parameter values. The two recipes can be two different variants or versions of a common family of recipes, preferably relating to the same food product to be manufactured and/or packaged. Alternatively, it is possible that the first and the second recipe concern different food products to be produced and/or packaged, but have at least one common parameter of which the respective parameter values in the first and second recipe can be compared with each other.

Preferably, it is provided that the first and the second recipe are stored in a memory of the food machine. In this respect, the recipes for operating the food machine can be kept in the food machine itself. A transfer of the data from an external memory to the food machine or the display device is not necessary.

An alternative, preferred embodiment provides that the first and second recipes are stored in an external memory connected to the food machine, in particular in a cloud memory. Although such an embodiment requires data exchange between the food machine, in particular the display device, the advantage can be achieved that the same recipes stored in a common external memory can be retrieved by several, different food machines.

An advantageous embodiment provides that the display device comprises a touch-sensitive screen, for example a touchscreen. In this respect, the display device can be part of an operating and display device via which both information can be displayed and operating commands, for example touching of an area of the screen or a swipe gesture, can be received.

Another object of the invention is to provide a display device for a food machine, in particular a food processing machine or a food packaging machine, which is configured a. in an ascertainment step to ascertain a parameter that is contained in a second recipe and not in a first recipe; and b. in a first display step to display the ascertained parameter and a specification, in particular a name, of the second recipe.

Another object of the invention is to provide a food machine, in particular a food processing machine or a food packaging machine, comprising a display device as described above.

For example, the food machine can be a slicer, defroster, cutter, mixer, thermoforming packaging machine, vertical form fill seal machine, or horizontal form fill seal machine.

The food machine can be suitable for meat, poultry, fish/seafood, cheese, meat substitutes, protein substitutes such as from insects or fungi, farmed meat, vegetables, pizza, bread, bakery products, pastries, biscuits or the like. The food machine designed as a food processing machine, in particular a meat processing machine, can be formed as a thawing machine, a cutter machine, a mixer machine, a tumbler machine, a crusher machine, an emulsifier machine, a marinating machine, a massaging machine, a meat injector machine, a filtration machine for brine and/or meat ingredients, a cooling machine for brine, a meat press machine, a freezer machine, a thawing machine, a tenderizer machine, a shaker machine, a fat analyzer machine, a pumping machine, a crusher machine, forming or portioning machine, coating machine such as dough/breading/crumbling/cooking oil machine, dust-removing machine, drying/cooking/browning/frying/steaming/sous vide machine, frying machine, grilling machine, smoking machine, frying oil filtering machine, oven/heating/cooking installation, food scanner, slicing machine, weighing machine, system for detecting foreign objects such as metal/plastic/bone, cleaning system for a food contact region, for example for injection needles, or transport system, filling/loading and/or unloading system and/or conveying system and/or dosing system. The food machine formed as a food packaging machine can be formed as a thermoforming packaging machine, vertical form fill seal machine or horizontal form fill seal machine, bottle filling machine, filling machine, labeler/printer, lollipop forming/cooling/wrapping machine, lollipop packaging machine, sugar cube forming/drying/packaging machine, or depositor. Alternatively, the food machine can be an automation/control/line control system for one or more of the aforementioned machines.

Further details, features and advantages of the invention will become apparent from the drawings, as well as from the following description of preferred embodiments based on the drawings. The drawings merely illustrate exemplary embodiments of the invention, which do not limit the concept of the invention.

DETAILED DESCRIPTION

In the various figures, identical parts are always provided with the same reference signs and are therefore generally also named or mentioned only once in each case.

Figure 1:
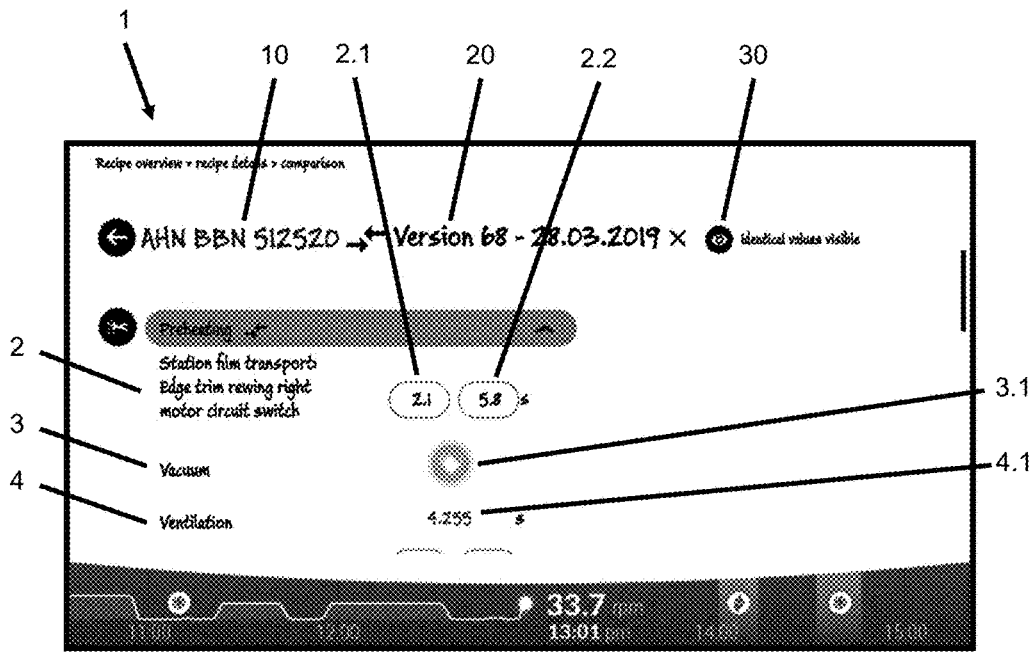
FIG. 1 shows a schematic illustration of a display displayed using a method for presenting parameters of a food machine according to an exemplary embodiment of the invention.

The illustration in FIG. 1 shows a display of a display device 1 for a food machine, in particular a food processing machine or a food packaging machine. The display device 1 according to the exemplary embodiment comprises a touch-sensitive screen with a screen surface. Information can be displayed via this screen and operating inputs from an operator can be detected, for example a touching of certain areas of the screen or swiping gestures.

As can be further seen from the illustration in FIG. 1, the display device 1 is configured to display both a first parameter value 2.1 and a second parameter value 2.2 simultaneously to a first display step for a parameter 2. These parameter values are assigned to two different parameter data sets, which are referred to as recipes and the names of which are shown in the display device 1, cf. the reference signs 10 and 20. In a ascertainment step preceding the first display step chronologically, one or more parameters which are contained in the first and the second recipe and which are each assigned a first parameter value 2.1 of the first recipe (here "2.1 s") and a second parameter value 2.2 of the second recipe (here "5.8 s"), which differ from one another, are first determined from the parameters of the two recipes. Therefore, the view shown in FIG. 1 allows a comparison of the parameter values 2.1, 2.2 of two recipes, or a comparison of entire recipes.

The recipes are stored in a memory that is configured as part of the food machine. The first recipe comprises multiple parameters, each of which is assigned a first parameter value, and the second recipe comprises multiple parameters, each of which is assigned a second parameter value.

The first recipe 10 can be a predefined standard recipe. The second recipe 20 can be a recipe which has been changed by an operator of the food machine with respect to the standard recipe. By means of the display shown in FIG. 1, this change can be made visible.

It can be provided that the second recipe 20 is automatically stored when the recipe 10 is changed, wherein the name of the second recipe is supplemented by a version specification, for example a version number that is higher by one is assigned.

Alternatively, the recipes 10, 20 to be compared can be specifically selected by the operator. For example, in a selection step preceding the ascertainment step—the first recipe 10 and the second recipe 20 can be selected by an operator of the food machine from a predefined set of stored recipes. For this purpose, in the selection step, a list of stored recipes can be displayed in the display device 1. The operator can select, for example by touching the display surface of the display device 1, two recipes to be compared.

Alternatively, it is possible for the user to select one or more of the recipes 10, 20 to be compared by detecting an indicator, such as a bar code, by a detection device, such as an optical detection device of the bar code reader type. A selection unit can then determine the recipe in question from the predefined set of stored recipes depending on the detected indicator.

As further shown in FIG. 1, in the first display step, by means of the display device 1, in addition to the first and second parameter values 2.1, 2.1 of the ascertained parameter 2, one or more further parameter values 3.1, 4.1 of further parameters 3, 4 can also be displayed, which are contained in the first recipe 10 and the second recipe 20 and which each have an assigned identical further parameter value 3.1, 4.1 according to the first recipe 10 and the second recipe 20. In the present case, parameter value 3.1 assigned to the upper parameter 3 is a Boolean value that may be true or false, and parameter value 4.1 assigned to the lower parameter 4 is a numerical value indicating a time in seconds.

The further parameter values 3.1, 4.1 are displayed in the display device 1 in a different color and/or a different brightness than the first and second parameter values 2.1, 2.2. In the present case, the brightness of the further parameter values 3.1, 4.1 is selected to be lower or the color is selected to be lighter, so that the further parameter values 3.1, 4.1 are subordinate relative to the first and second parameter values 2.1, 2.2 and the attention of the operator is directed to the first and second parameter values 2.1, 2.2.

The display of the further parameter values 3.1, 4.1 can be activated and deactivated. For this purpose, the display device comprises a symbol 30. When the operator makes an input, for example actuating the symbol 30 by pressing on the display surface of the display device 1 in the area of the symbol 30, switching takes place between the presentation of the further parameter values 3.1, 4.1 and a display without these further parameter values 3.1, 4.1. In this respect, it is possible to switch back and forth between these two display steps.

According to a variation of the exemplary embodiment, the recipes are stored in an external memory connected to the food machine, in particular in a cloud memory.

In the display devices 1 described above, a method for displaying parameters of a food machine, in particular a food processing machine or a food packaging machine, by means of a display device 1 of the food machine can be implemented, wherein a memory stores a first recipe comprising multiple parameters that each have an assigned first parameter value and stores a second recipe comprising multiple parameters that each have an assigned second parameter value, a. wherein in an ascertainment step a parameter is ascertained that is contained in the first and the second recipe and that has an assigned first parameter value of the first recipe and an assigned second parameter value of the second recipe, which differ from each other, b. wherein in a first display step the display device (1) is used to display the first and the second parameter value for the ascertained parameter at the same time.

This makes it easier for the operator to determine any causes that have led to an undesirable state of the food machine, in particular a fault state.

Figure 2:
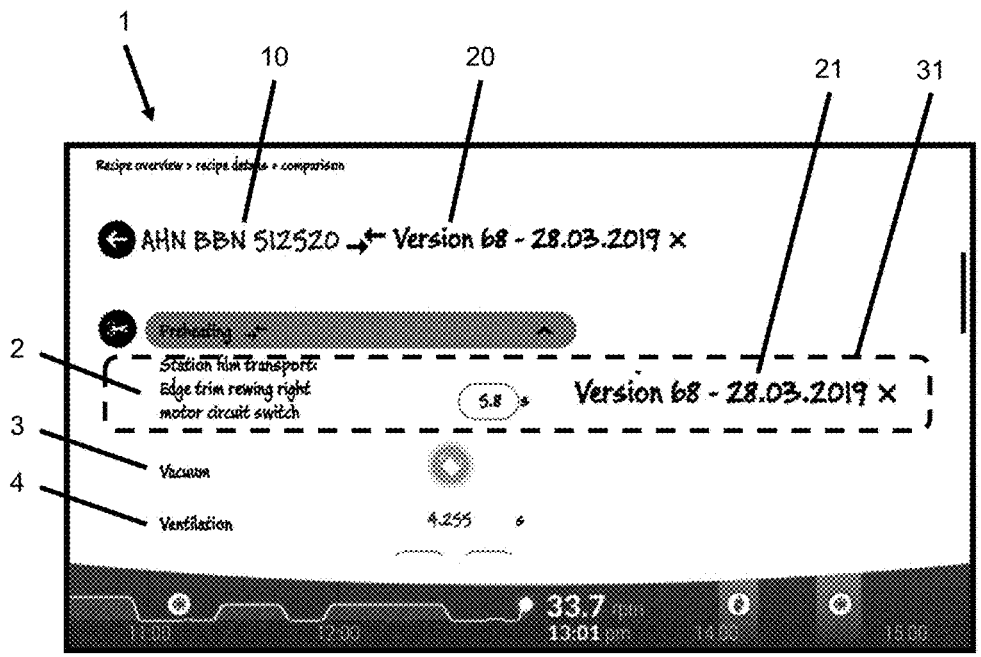
FIG. 2 shows a schematic illustration of a display displayed using a method for presenting parameters of a food machine according to another exemplary embodiment of the invention.

The illustration in FIG. 2 shows a further display of a display device 1 for a food machine, in particular a food processing machine or a food packaging machine. The display device 1 according to FIG. 2 comprises a touch-sensitive screen with a screen surface. Information can be displayed via this screen and operator inputs can be detected, for example touching of certain areas of the screen or swiping gestures.

As can be further seen from the illustration in FIG. 2, the display device 1 is configured to display, in a first display step for a parameter 2, a specification of the recipe in which this parameter is used. The specification 21 of the recipe is achieved by the name of the recipe. In addition, the parameter is marked by a symbol 31—for example, as shown in FIG. 2, by a box with a dashed line. In an ascertainment step preceding the first display step chronologically, one or more parameters which are contained in the second recipe but not in the first recipe are first determined from the parameters of two recipes. Therefore, the view shown in FIG. 2 allows a comparison of the recipes.

The recipes are stored in a memory that is formed as part of the food machine. The first recipe comprises multiple parameters here which each have an assigned first parameter value, and the second recipe comprises multiple parameters which each have an assigned second parameter value.

The first recipe 10 can be a predefined standard recipe. The second recipe 20 can be a recipe which has been changed by an operator of the food machine compared to the standard recipe. This change can be made visible by means of the display shown in FIG. 2.

It can be provided that the second recipe 20 is automatically stored when the recipe 10 is changed, wherein a version specification is added to the name of the second recipe, for example, a version number that is higher by one is assigned.

Alternatively, the recipes 10, 20 to be compared can be specifically selected by the operator. For example, in a selection step preceding the ascertainment step, the first recipe 10 and the second recipe 20 can be selected by an operator of the food machine from a predefined set of stored recipes. For this purpose, in the selection step, a list of stored recipes can be displayed in the display device 1. The operator can select, for example by touching the display surface of the display device 1, two recipes to be compared.

According to a variation of the exemplary embodiment, the recipes are stored in an external memory connected to the food machine, in particular in a cloud memory.

LIST OF REFERENCE SIGNS

1 display device
2 first parameter
2.1 first parameter value
2.2 second parameter value
3 second parameter
3.1 further (identical) parameter value
4 third parameter
4.1 further (identical) parameter value
10 first recipe name
20 second recipe name
21 recipe specification
30 symbol
31 symbol

The invention claimed is:

1. A method for presenting parameters of a food packaging machine in which a food product is packaged by the food packaging machine, the parameters are presented by a display device of the food packaging machine, wherein a memory stores a first recipe comprising multiple parameters that each have an assigned first parameter value and stores a second recipe comprising multiple parameters that each have an assigned second parameter value, the method comprises a selection step preceding an ascertainment step,
   a. wherein in the selection step, the first recipe and the second recipe are selected by an operator from a specified set of stored recipes, wherein each of the first recipe and the second recipe comprise settable settings or properties of the food packaging machine;
   b. wherein in the ascertainment step, a parameter is ascertained that is contained in the first recipe and in the second recipe and that has the assigned first parameter value of the first recipe and the assigned second parameter value of the second recipe, which differ from each other; and in the ascertainment step, a comparison of the parameter contained in the first recipe and in the second recipe is performed, attributes assigned to the parameter of the first recipe and the second recipe are compared with one another, and to ascertain differing parameter values, a comparison of the first parameter value of the parameter in the first recipe and the second parameter value of the parameter in the second recipe is performed by comparing binary data;
   c. wherein in a first display step after the ascertainment step, the display device is used to display the first parameter value and the second parameter value which differ from each other for the ascertained parameter at the same time for an operator to detect changes with respective to the settable settings or properties of the first recipe and/or the second recipe associated with the food packaging machine.

2. The method as claimed in claim 1, wherein for selecting the first recipe and/or the second recipe, an indicator is detected by a detection device, and the first recipe and/or the second recipe is ascertained by a selection unit depending on the detected indicator.

3. The method as claimed in claim 2, wherein the indicator is an optically detectable indicator and the detection device is an optical detection device.

4. The method as claimed in claim 1, wherein the first recipe and the second recipe are stored in the memory of the food packaging machine.

5. The method as claimed in claim 1, wherein the first recipe and the second recipe are stored in an external memory connected to the food packaging machine or a cloud memory.

6. The method as claimed in claim 1, wherein in the first display step, the display device is used to display, in addition to the first parameter value and the second parameter value of the ascertained parameter, a further parameter value of a further parameter which is contained in the first recipe and in the second recipe and which has an assigned identical third parameter value according to the first recipe and the second recipe.

7. The method as claimed in claim 1, wherein in a second display step, the display device is used to display, in addition to the first parameter value and the second parameter value of the ascertained parameter, a further parameter value of a further parameter which is contained in the first recipe and in the second recipe and which has an assigned identical third parameter value according to the first recipe and the second recipe, wherein the further parameter value is not displayed in the first display step, and wherein a change is made, back and forth, between the first display step and the second display step by an input of an operator.

8. The method as claimed in claim 6, wherein the third parameter value is displayed in a different presentation form, only as a single value and/or in a different font and/or in a different font size and/or in a different color and/or against a different background color and/or in a different brightness than the first parameter value and the second parameter value.

9. The method as claimed in claim 1, wherein the display device comprises a touch-sensitive screen or a touchscreen.

10. A method for presenting parameters of a food packaging machine in which a food product is packaged by the food packaging machine, the parameters are presented by a display device, wherein a memory stores a first recipe comprising multiple parameters which each have an assigned first parameter value, and stores a second recipe comprising multiple parameters which each have an assigned second parameter value, the method comprises a selection step preceding an ascertainment step,
   a. wherein in the selection step, the first recipe and the second recipe are selected by an operator from a specified set of stored recipes, wherein each of the first recipe and the second recipe comprise settable properties of food packaging machine;

b. wherein in the ascertainment step, a parameter is ascertained which is contained in the second recipe and is not contained in the first recipe, wherein in the ascertainment step, a comparison of parameters of the first recipe and the second recipe is performed, wherein attributes assigned to the parameters of the first recipe and the second recipe are compared with one another, c. wherein in a first display step following the ascertainment step, the ascertained parameter and a specification or a name, of the second recipe are displayed by the display device for an operator to detect changes with respective to the settable settings or properties of the first recipe and/or the second recipe associated with the food packaging machine.

11. The method as claimed in claim 10, wherein the first recipe and the second recipe are stored in a memory of the food packaging machine.

12. The method as claimed in claim 10, wherein the first recipe and the second recipe are stored in an external memory or a cloud memory connected to the food packaging machine.

13. The method as claimed in claim 10, wherein the display device comprises a touch-sensitive screen or a touchscreen.

14. The method as claimed in claim 1, wherein the food packaging machine is a thermoforming packaging machine, a vertical form fill seal machine or horizontal form fill seal machine, a bottle filling machine, a filling machine, a labeler/printer, a lollipop forming/cooling/wrapping machine, a lollipop packaging machine, a sugar cube forming/drying/packaging machine, or a depositor.

15. The method as claimed in claim 1, wherein the first recipe is a predefined standard recipe, and the second recipe is a variant recipe of the first recipe that has been changed by an operator of the food packaging machine.

16. The method as claimed in claim 1, wherein the second recipe is automatically stored in the food packaging machine when the second recipe is changed by the operator.

17. The method as claimed in claim 2, wherein the indicator is a barcode and the detection device is an optical detector and a selection unit of the food packaging machine is configured to determine the recipe from a predefined set of stored recipes depending on the detected indicator.

18. The method as claimed in to claim 1, wherein a cause of fault of the food packaging machine is ascertained by comparing the parameter contained in the first recipe and the parameter contained in the second recipe.

19. The method as claimed in claim 18, wherein binary data is compared to ascertain the differences between the parameter contained in the first recipe and the parameter contained in the second recipe.

20. The method as claimed in claim 10, wherein:
   i) the food packaging machine is a thermoforming packaging machine, a vertical form fill seal machine or horizontal form fill seal machine, a bottle filling machine, a filling machine, a labeler/printer, a lollipop forming/cooling/wrapping machine, a lollipop packaging machine, a sugar cube forming/drying/packaging machine, or a depositor;
   ii) the first recipe is a predefined standard recipe, and the second recipe is a variant recipe of the first recipe that has been changed by an operator of the food packaging machine;
   iii) the second recipe is automatically stored in the food packaging machine when the second recipe is changed by the operator;
   iv) a cause of fault of the food packaging machine is ascertained by comparing the parameter contained in the first recipe and the parameter contained in the second recipe; and
   v) binary data is compared to ascertain the differences between the parameter contained in the first recipe and the parameter contained in the second recipe.

* * * * *